(12) United States Patent
Gaw et al.

(10) Patent No.: US 11,613,680 B2
(45) Date of Patent: Mar. 28, 2023

(54) SEGMENTED FILM ADHESIVE, METHOD OF MAKING THE ADHESIVE AND METHOD OF APPLYING THE ADHESIVE TO A NON-PLANAR SURFACE

(71) Applicant: The Boeing Company, Chicago, IL (US)

(72) Inventors: Kevin O'Brien Gaw, Tukwila, WA (US); James Daniel Whitt, Renton, WA (US); Erdal Bayseckin, Renton, WA (US); Robert Francis McDevitt, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 826 days.

(21) Appl. No.: 16/570,935

(22) Filed: Sep. 13, 2019

(65) Prior Publication Data

US 2020/0010745 A1 Jan. 9, 2020

Related U.S. Application Data

(62) Division of application No. 15/299,020, filed on Oct. 20, 2016, now abandoned.

(51) Int. Cl.
*C09J 167/00* (2006.01)
*C09J 5/00* (2006.01)
*C09J 175/04* (2006.01)
*C09J 163/00* (2006.01)
*C09J 7/10* (2018.01)
(Continued)

(52) U.S. Cl.
CPC ......... *C09J 167/00* (2013.01); *B32B 37/0076* (2013.01); *B32B 37/12* (2013.01);
(Continued)

(58) Field of Classification Search
CPC ........ B32B 2305/024; B32B 2305/026; B32B 2311/24; B32B 2317/12; B32B 37/0076;
(Continued)

(56) References Cited

U.S. PATENT DOCUMENTS 3,414,426 A * 12/1968 Hughes ................... B44C 3/123
118/308
3,741,786 A 6/1973 Torrey
(Continued)

OTHER PUBLICATIONS https://www.ebi.ac.uk/chebi/searchid.do;A89DFCA7829681968B0AF2A1DD6CC9E5?chebiId=CHEBI:53250 (Year 2018), 2 pages.

*Primary Examiner* — Philip C Tucker
*Assistant Examiner* — Brian R Slawski
(74) *Attorney, Agent, or Firm* — MH2 Technology Law Group LLP

(57) ABSTRACT

A method of applying an adhesive to a non-planar surface. The method includes providing a segmented film adhesive. The segmented film adhesive comprises: (i) a liner; and (ii) an adhesive layer on the liner, the adhesive layer comprising a plurality of contiguous, discrete adhesive segments. The segmented film adhesive is positioned on a non-planar surface of a first adherend so that a first portion of the discrete adhesive segments are in contact with the non-planar surface and a second portion of the discrete adhesive segments are not in contact with the non-planar surface. The liner is removed from the non-planar surface, wherein only the first portion of the discrete adhesive segments remain on the non-planar surface of the first adherend.

20 Claims, 7 Drawing Sheets

(51) Int. Cl.
*C09J 7/22* (2018.01)
*B32B 37/12* (2006.01)
*B32B 37/00* (2006.01)
*B32B 38/10* (2006.01)

(52) U.S. Cl.
CPC .......... *B32B 37/1292* (2013.01); *B32B 38/10* (2013.01); *C09J 5/00* (2013.01); *C09J 7/10* (2018.01); *C09J 7/22* (2018.01); *C09J 163/00* (2013.01); *C09J 175/04* (2013.01); *B32B 2305/024* (2013.01); *B32B 2305/026* (2013.01); *B32B 2311/24* (2013.01); *B32B 2317/12* (2013.01); *C08G 2170/40* (2013.01); *C09J 2301/204* (2020.08); *C09J 2301/302* (2020.08); *C09J 2400/283* (2013.01); *C09J 2463/00* (2013.01); *C09J 2467/00* (2013.01); *C09J 2475/00* (2013.01)

(58) Field of Classification Search
CPC ..... B32B 37/12; B32B 37/1292; B32B 38/10; B32B 7/14; B32B 37/1207; B32B 37/1215; B32B 37/1253; C08G 2170/40; C09J 163/00; C09J 167/00; C09J 175/04; C09J 2301/204; C09J 2301/302; C09J 2400/283; C09J 2463/00; C09J 2467/00; C09J 2475/00; C09J 5/00; C09J 7/10; C09J 7/22; B29C 65/48; B29C 65/4825; B29C 66/301; B29C 65/5057
USPC ......... 156/60, 230, 234, 235, 247, 249, 250, 156/256, 264, 265, 266, 289, 297, 299, 156/300, 307.1, 307.7, 308.2, 309.6, 330, 156/331.4, 332; 428/343, 352, 349, 428/195.1, 200
See application file for complete search history.

(56) References Cited

U.S. PATENT DOCUMENTS

| | | |
|---|---|---|
| 3,932,326 A | 1/1976 | Hou et al. |
| 5,141,790 A | 8/1992 | Calhoun et al. |
| 5,650,215 A | 7/1997 | Mazurek et al. |
| 5,886,799 A | 3/1999 | Molteni et al. |
| 5,935,670 A | 8/1999 | Downs |
| 5,951,797 A * | 9/1999 | Majumdar ............... B29C 66/43 156/128.6 |
| 6,524,675 B1 | 2/2003 | Mikami et al. |
| 7,506,450 B2 | 3/2009 | Spaulding et al. |
| 7,713,606 B2 * | 5/2010 | Kasahara ............... B65H 37/007 428/41.5 |
| 7,914,207 B1 | 3/2011 | Beam |
| 8,006,734 B2 * | 8/2011 | Hajny .................. B65H 37/005 156/578 |
| 9,477,059 B2 | 10/2016 | Larson et al. |
| 2005/0084641 A1 | 4/2005 | Downs et al. |
| 2005/0255275 A1 | 11/2005 | Downs et al. |
| 2005/0266198 A1 | 12/2005 | Downs et al. |
| 2007/0020444 A1* | 1/2007 | Moore .................... B43L 1/045 428/195.1 |
| 2008/0057251 A1* | 3/2008 | Griswold ............... C09J 183/08 428/40.1 |
| 2013/0220510 A1 | 8/2013 | Yamamoto et al. |
| 2013/0330544 A1 | 12/2013 | Toyama et al. |
| 2015/0020956 A1* | 1/2015 | Larson ............... H01B 11/1895 428/189 |
| 2015/0320606 A1 | 11/2015 | Kawahara et al. |
| 2015/0328831 A1 | 11/2015 | Dhinojwala et al. |
| 2016/0198790 A1* | 7/2016 | Ishmael ................. A41D 13/06 2/239 |
| 2016/0376473 A1 | 12/2016 | Furuta et al. |
| 2018/0043653 A1 | 2/2018 | Sutou et al. |

\* cited by examiner

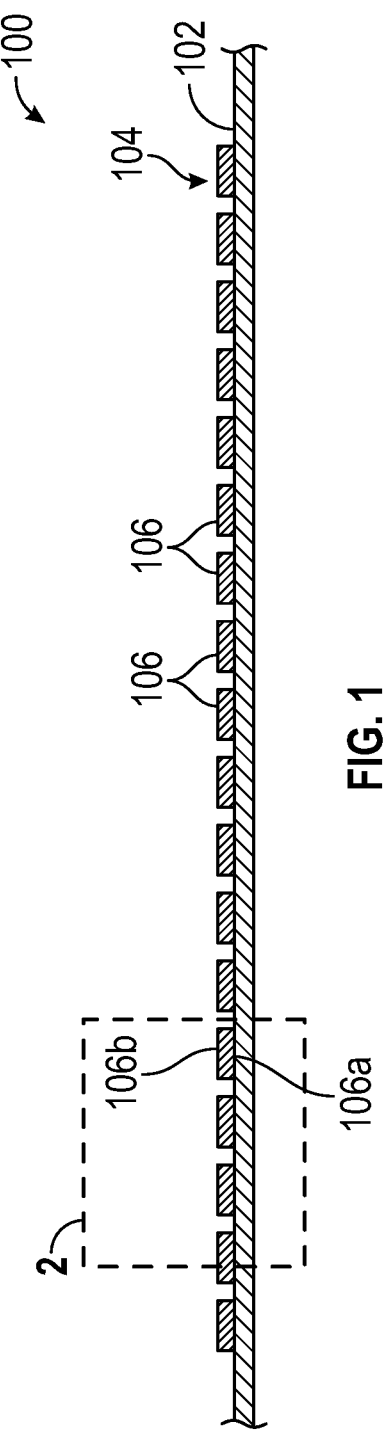
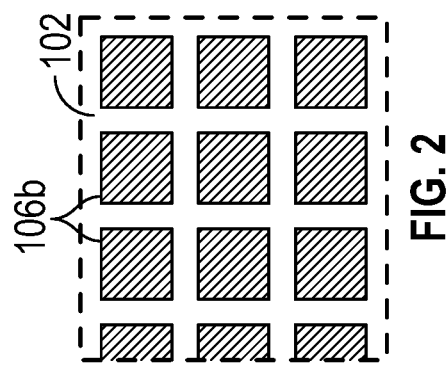

SEGMENTED FILM ADHESIVE, METHOD OF MAKING THE ADHESIVE AND METHOD OF APPLYING THE ADHESIVE TO A NON-PLANAR SURFACE

CROSS-REFERENCE TO RELATED APPLICATIONS

This application is a divisional application and claims priority to U.S. patent application Ser. No. 15/299,020 filed Oct. 20, 2016, now abandoned, the disclosure of which is incorporated herein by reference in its entirety

DETAILED DESCRIPTION

Field of the Disclosure

The present disclosure is directed to a segmented film adhesive, a method of making the adhesive and a method of applying the adhesive to a non-planar surface.

BACKGROUND

Film adhesives, sometimes referred to as tape, are well known. These adhesives work well for generally planar surfaces. However, for many non-planar surfaces with both raised and recessed surface features, film adhesives may allow for the adhesive to adhere only to the raised features, while at the same time bridging the gaps between the raised features where the film adhesive does not adhere to recessed surfaces. Such non-adhesion over recessed surfaces is undesirable and can result in the formation of unwanted pores.

Thus, there is a need in the art for film adhesives that can be applied to non-planar surfaces and that can solve one or more of the problems described above.

SUMMARY

The present disclosure is directed to a segmented film adhesive. The segmented film adhesive comprises a liner having a first major surface and a second major surface opposing the first major surface. An adhesive layer is on the liner. The adhesive layer comprises a plurality of contiguous, discrete adhesive segments on the first major surface of the liner.

The present disclosure is also directed to a method of applying an adhesive to a non-planar surface. The method comprises providing a segmented film adhesive. The segmented film adhesive comprises: (i) a liner and (ii) an adhesive layer on the liner. The adhesive layer comprises a plurality of discrete adhesive segments. The segmented film adhesive is positioned on a non-planar surface of a first adherend so that a first portion of the discrete adhesive segments are in contact with the non-planar surface and a second portion of the discrete adhesive segments are not in contact with the non-planar surface. The liner is removed from the non-planar surface. Only the first portion of the discrete adhesive segments remain on the non-planar surface of the first adherend.

The present disclosure is directed to a method of making a segmented film adhesive. The method comprises providing a liner having a first major surface and a second major surface opposing the first major surface. The method further comprises forming a segmented adhesive layer on the liner. The segmented adhesive layer comprises a plurality of contiguous, discrete adhesive segments on the first major surface of the liner.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

FIG. 1 illustrates a cross-sectional segmented film adhesive, according to an aspect of the present disclosure.

FIG. 2 illustrates a top view of a segmented film adhesive, according to an aspect of the present disclosure.

Figure 3A:
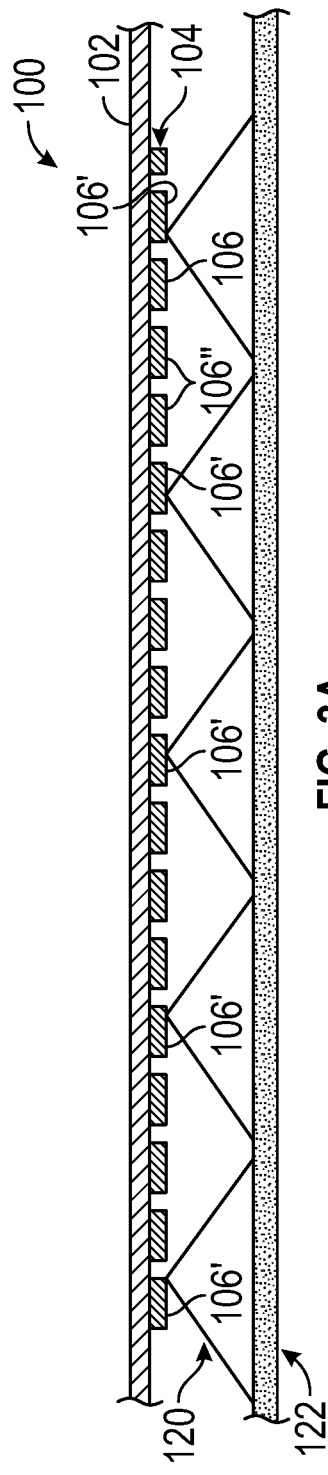
FIG. 3A illustrates a segmented film adhesive positioned on a non-planar surface of a first adherend, according to an aspect of the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The segmented film adhesive and methods of using the adhesive, as described herein, can provide one or more of the following advantages: the ability to selectively apply adhesive to raised features of a non-planar surface; the ability to avoid or reduce the formation of adhesive bridges between the raised features; or the ability to avoid or reduce the formation of pores and/or areas of non-adhesion over recessed surfaces of a non-planar surface.

FIG. 1 illustrates a segmented film adhesive 100. Segmented film adhesive 100 comprises a liner 102 having a first major surface and a second major surface opposing the first major surface. An adhesive layer 104 is positioned on the liner 102. The adhesive layer 104 comprises a plurality of contiguous, discrete adhesive segments 106 on the first major surface of the liner. The term "on" as used herein is defined broadly to include both direct physical contact and indirect physical contact, so that an intervening layer may or may not be formed between the liner and the adhesive. In an embodiment, the adhesive layer 104 is formed directly on the liner 102, where "directly on" requires direct physical contact between the adhesive layer and the liner.

Liner 102 can comprise any flexible material to which the adhesive segments 106 can be releasably attached. By "releasably attached" it is meant that the liner material can release with relative ease from the adhesive material, so as, for example, to allow the segmented adhesive to be removed from the liner 102 without significant deformation of the adhesive; and/or to allow the film adhesive to be rolled up and then dispensed from the roll without significant deformation of the adhesive, similar to a roll of tape. In an embodiment, the liner can be a single continuous, unbroken sheet or strip of material. Examples of flexible liner materials include polyethylene, polyurethane, polyvinylidene difluoride (PVDF), polytetrafluoroethylene (PTFE), polyoxymethylene (POM), silicone coated paper, silicone coated polymers, and combinations thereof. Examples of commercially available polyoxymethylene include DELRIN® made by DuPont of Wilmington, Del., or HOSTAFORM® made by Celanese of Dallas, Tex. The liner can comprise a single layer, or alternatively multiple layers, of the flexible material.

The plurality of discrete adhesive segments 106 comprise a first adhesive segment and one or more contiguous adhesive segments that share at least one common border with the first adhesive segment. The first adhesive segment can be released from the liner independently of each of the contiguous adhesive segments.

Each of the adhesive segments 106 have a first major surface 106a contacting the liner 102 and a second major surface 106b that is opposite the first major surface 106a. The first major surface 106a and the second major surface 106b can have any suitable shape, such a rectangle, triangle, hexagon or any other polygon. FIG. 2 shows adhesive segments having a rectangular (e.g., a square) surface. Circular shapes, such as circles, ovals or other geometrical shapes can also be used. In an embodiment, all or substantially all of the adhesive segments 106 have the same geometric shape. In other embodiments, the shape of the adhesive segments can vary from segment to segment.

Adhesive segments 106 can have any suitable size. In an embodiment, the size and/or shape of the segments can be chosen depending on the topography of the first adherend to which the adhesive segments are to be adhered. As examples, the dimensions can range from microns (for electronics) to inches or feet (e.g., for adhering roofing materials to a substructure). Thus, for some applications, each adhesive segment can include a major surface (e.g., surface 106a and/or surface 106b) having a surface area of about 1 micron$^2$ to about 4 ft$^2$, or about $\frac{1}{256}$ in$^2$ to about 1 ft$^2$, or about $\frac{1}{16}$ in$^2$ to about 9 in$^2$, or about $\frac{1}{4}$ in$^2$ to about 1 or 2 in$^2$.

The adhesive segments 106 comprise is a pressure sensitive adhesive material. Any suitable adhesive material that can be releasably attached to the liner 102 can be employed. Examples of suitable adhesives include a material chosen from polyurethane, epoxy, isocyanate, polyester and mixtures thereof.

Preferably 100%, or close to 100% (e.g., 90% or more) of the adhesive segments that contact the non-planar surface will adhere to the contacted regions on the surface to be bonded. In practice, however, a lessor amount, such as, for example, 50% or more, may adhere to the contacted regions, depending on the properties of the segmented adhesive and the surface morphology of the non-planar surface.

Figure 3B:
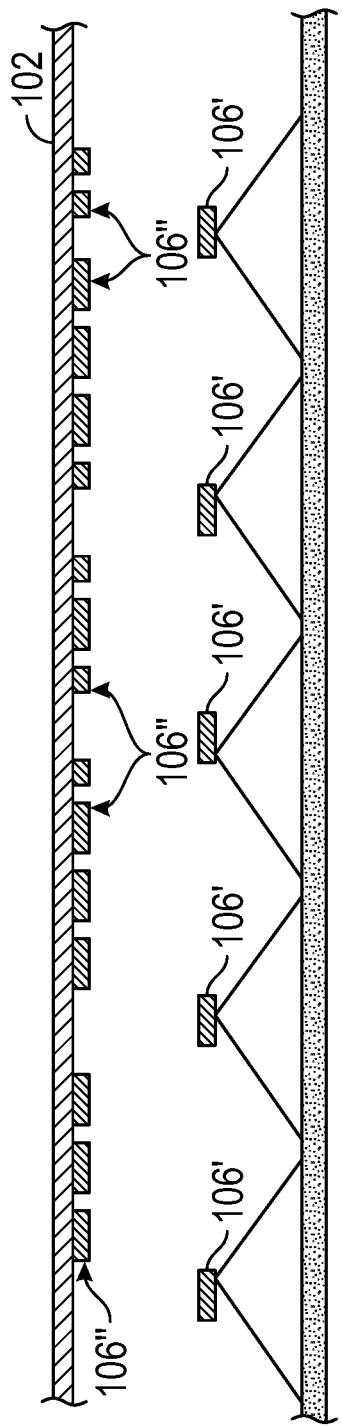
FIG. 3B illustrates the segmented film adhesive of FIG. 3A, where the liner is removed from the non-planar surface, according to an aspect of the present disclosure.

An embodiment of the present disclosure is also directed to a method of applying an adhesive to a non-planar surface. As shown in FIG. 3A, the method comprises providing a segmented film adhesive 100, such as any of the segmented film adhesives described herein. The segmented film adhesive 100 is positioned on a non-planar surface 120 of a first adherend 122 so that a first portion of the discrete adhesive segments 106' are in contact with the non-planar surface 120 and a second portion of the discrete adhesive segments 106" are not in contact with the non-planar surface 120. The liner 102 is then removed from the non-planar surface 120, as shown in FIG. 3B. After removal of the liner 102, only the first portion of discrete adhesive segments 106' directly contacting the non-planar surface remain on the first adherend 122, while the second portion of discrete adhesive segments 106" remain on the liner 102.

The term "non-planar surface", as used herein, is defined to be any surface with both raised and recessed surface features. Examples include surfaces with ruts and ridges, or surfaces with other asperities, such as the corrugated surfaces and sharp surfaces shown in FIGS. 6 to 11. Still other non-planar surfaces can have raised surfaces formed from edges of a columnar support, such as the cell structures described herein and/or shown as adherend 122 in FIGS. 4, 5A and 5B. The topography of the non-planar surface is sufficiently non-uniform so as to allow the segmented film adhesives of the present disclosure to deposit adhesive segments only on the raised surface features while leaving at least some recessed surfaces without adhesive segments. Thus, at least some of the areas between the raised portions of the non-planar surface can be sufficiently large so that one or more of the segments 106 do not contact the non-planar surface when the segmented film adhesive is positioned in contact with the raised portions of the non-planar surface.

Figure 3C:
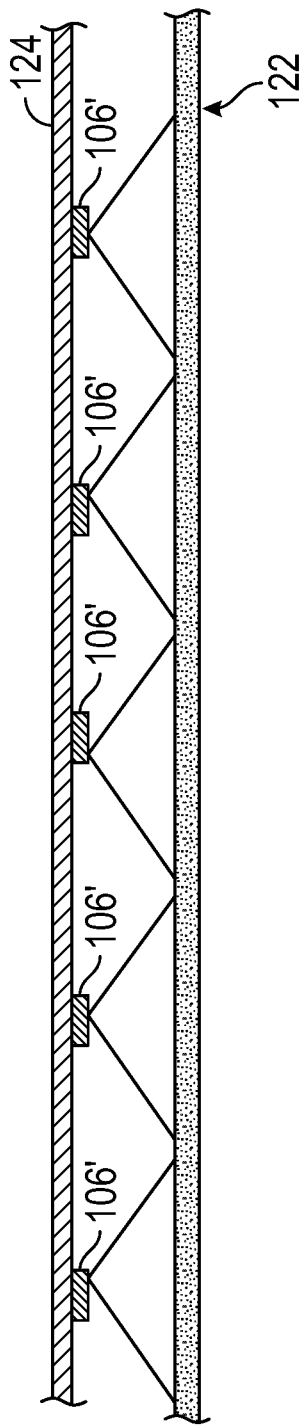
FIG. 3C illustrates the segmented film adhesive of FIG. 3B, wherein a second adherend is positioned in contact with the discrete adhesive segments remaining on the non-planar surface of the first adherend, according to an aspect of the present disclosure.

After removal of the liner, a second adherend 124 can be positioned in contact with the discrete adhesive segments 106' remaining on the non-planar surface of the first adherend 122, as shown in FIG. 3C. In this manner, the first adherend 122 can be adhered to the second adherend 124.

Optionally, discrete adhesive segments 106' remaining on the non-planar surface 120 of the first adherend 122 can be heated to a sufficient temperature to melt or cure adhesive segments 106'. Depending on the type of adhesive used, thermally heating the discrete adhesive segments may cause the adhesive to melt and further spread out, or potentially cure, into and/or onto the bondline between the two adherends. Melting the adhesive and the further spreading of the adhesive along the bond-line between the two adherends may improve bonding. It may be possible that the further spreading of the adhesive along the bond-line may be aided by capillary action.

The methods of the present disclosure can be employed to make any desired product that includes one or more non-planar adherends. In one embodiment, the method is employed to make an acoustic panel that includes a layer having a suitable cell structure that can be, for example, an array of hollow cells formed between thin vertical walls. In an embodiment, the cells can be columnar and have a suitable polygon shaped cross-section. The polygon shaped cross-section can be, for example, hexagonal (such as in a honeycomb cell structure), rectangular or triangular in shape.

Figure 4:
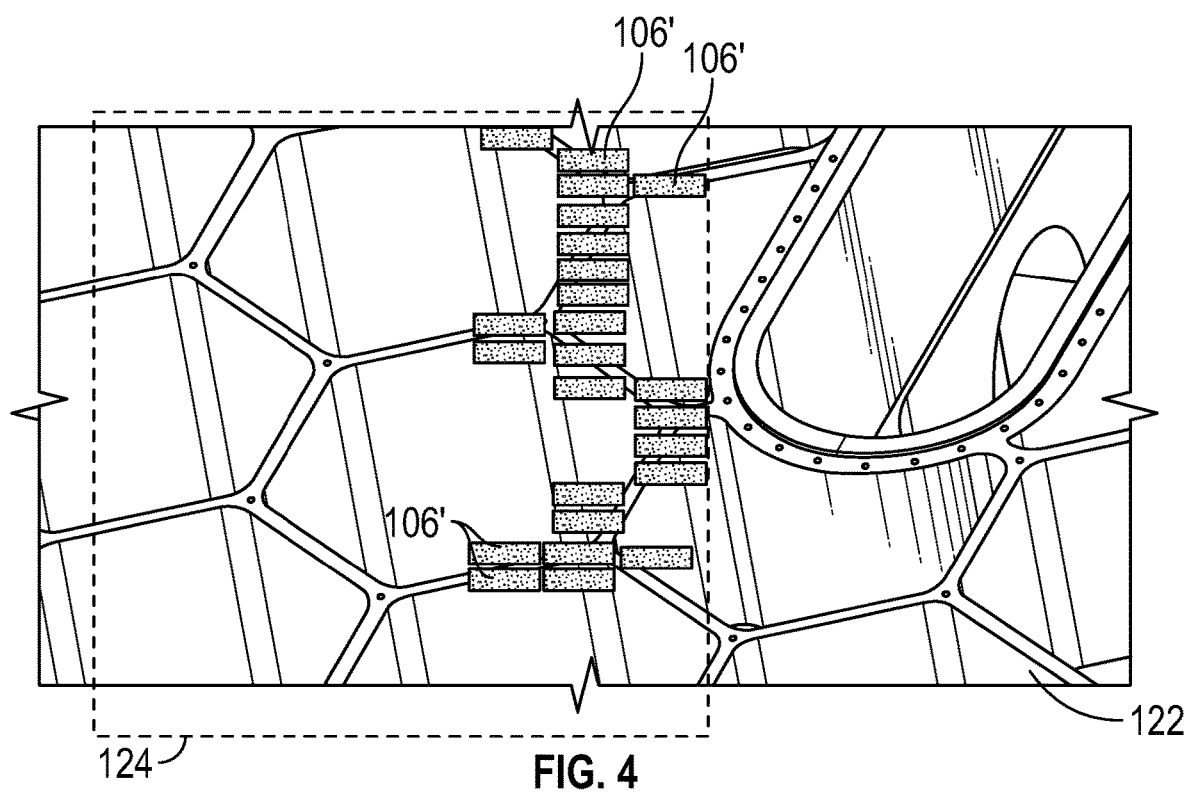
FIG. 4 illustrates one example of an acoustic panel for attenuating noise in an aircraft, according to an aspect of the present disclosure.
Figure 5A:
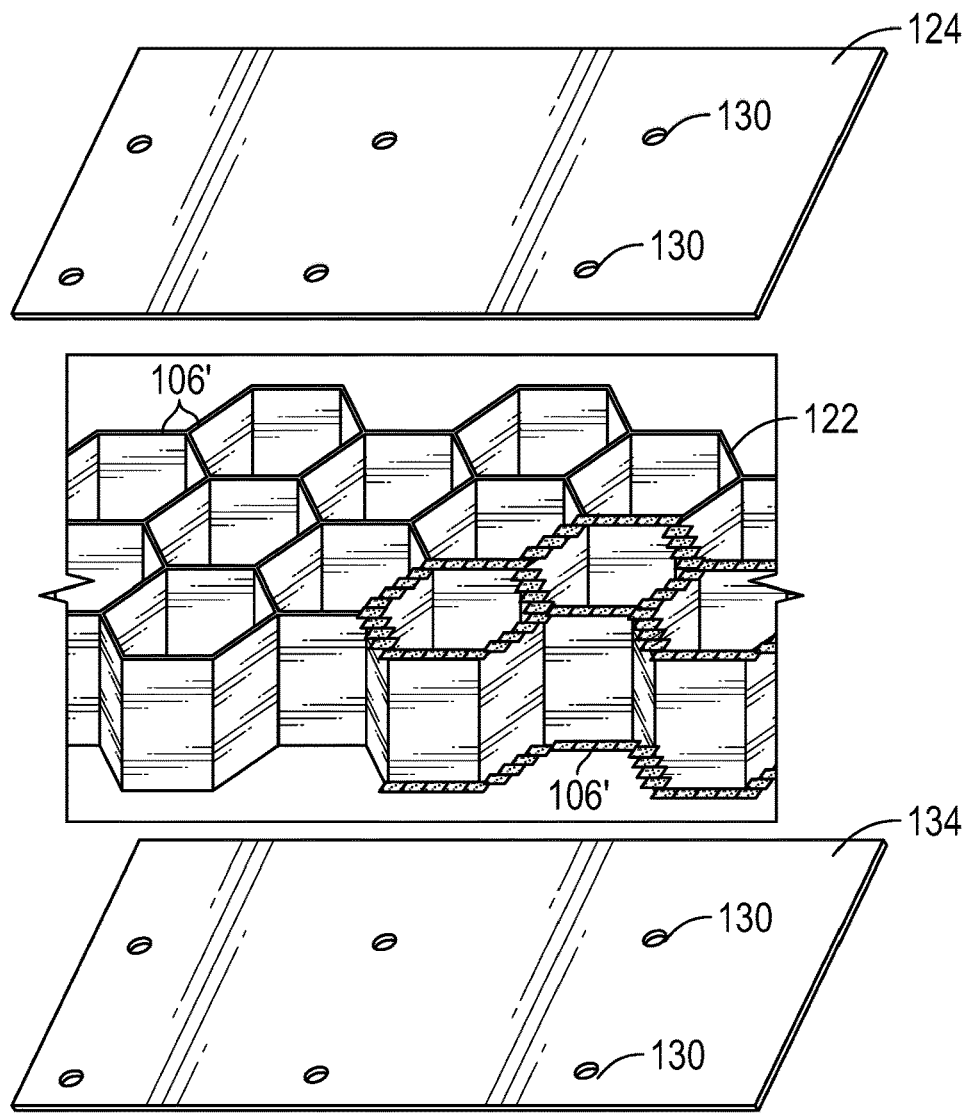
FIG. 5A illustrates an expanded view of an acoustic panel for attenuating noise in an aircraft, according to an aspect of the present disclosure.
Figure 5B:
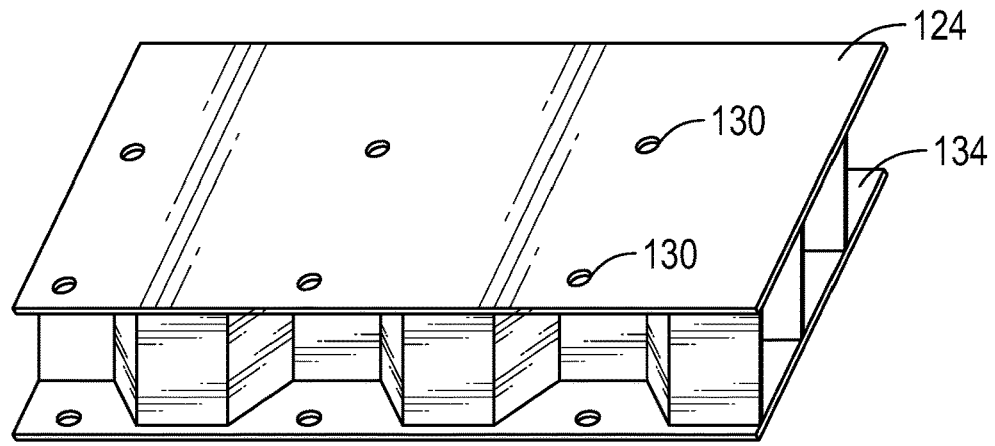
FIG. 5B illustrates an acoustic panel for attenuating noise in an aircraft, according to an aspect of the present disclosure.

In an embodiment, the method of the present disclosure can be used to make panels configured for use in aircraft. FIG. 4 illustrates an example of a portion of an acoustic panel that can be used for attenuating noise in aircraft. The acoustic panel comprises a first adherend 122 having a cell wall structure. Adherend 122 is illustrated as a honeycomb, or hexagonal, cell structure, but can be any type of cell structure described herein. First adherend 122 can comprise a material such as aluminum or paper optionally impregnated and/or coated with a resin. One example of suitable paper is paper impregnated and/or coated with phenolic resin, such as NOMEX paper, which is commercially available from DuPont, of Wilmington, Del. A second adherend 124 is bonded to the first adherend 122 using a plurality of adhesive segments 106' positioned on raised surfaces of the cell walls of the cell structure, as shown, for example in FIG. 4. The second adherend 124 can be a perforated panel, as shown in FIG. 5B, having a plurality of perforations 130. For illustration purposes, the panel 124 is shown in FIG. 4 by the dashed outline as covering only a portion of the surface of the honeycomb cell structure, and it is to be understood that the panel may cover the entire surface.

In an embodiment, additional adherends can be employed to fabricate the acoustic panels. For example, as shown in FIG. 5A, a second adherend 124 and third adherend 134 can be attached to the first adherend 122 using the adhesive segments 106', as described herein. During the fabrication process, the adhesive segments 106' can be applied to all or a portion of both of the raised surfaces of the honeycomb structure of first adherend 122 that are intended to contact adherends 124, 134. The completed product can be in the form of a sandwich structure, as shown in FIG. 5B.

The cell structure and the perforated panels of the acoustic panels, such as those shown in FIG. 4 and FIGS. 5A and 5B, can be configured for noise reduction in various applications, such as for attenuating engine noise in an aircraft or in other non-aircraft applications where noise attenuation is desired. The use of the adhesion application methods of the present disclosure allow the adhesive to be selectively applied to the raised portions of the cell walls so as not to block to flow of air through perforations 130 and cells of the honeycomb structure.

Figure 6:
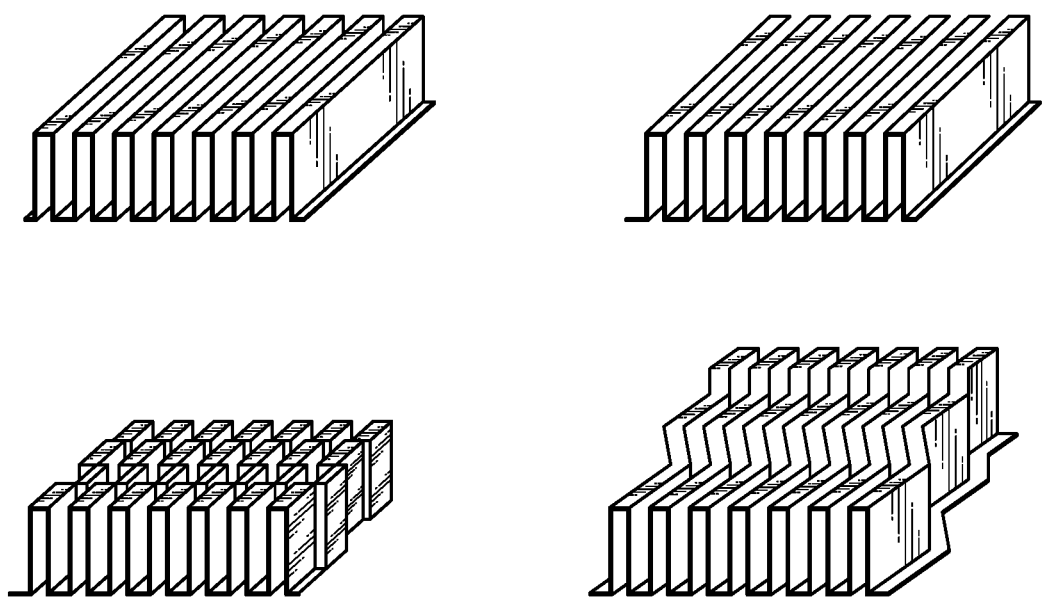
FIG. 6 illustrates a corrugated, non-planar surface, according to an aspect of the present disclosure.
Figure 7:
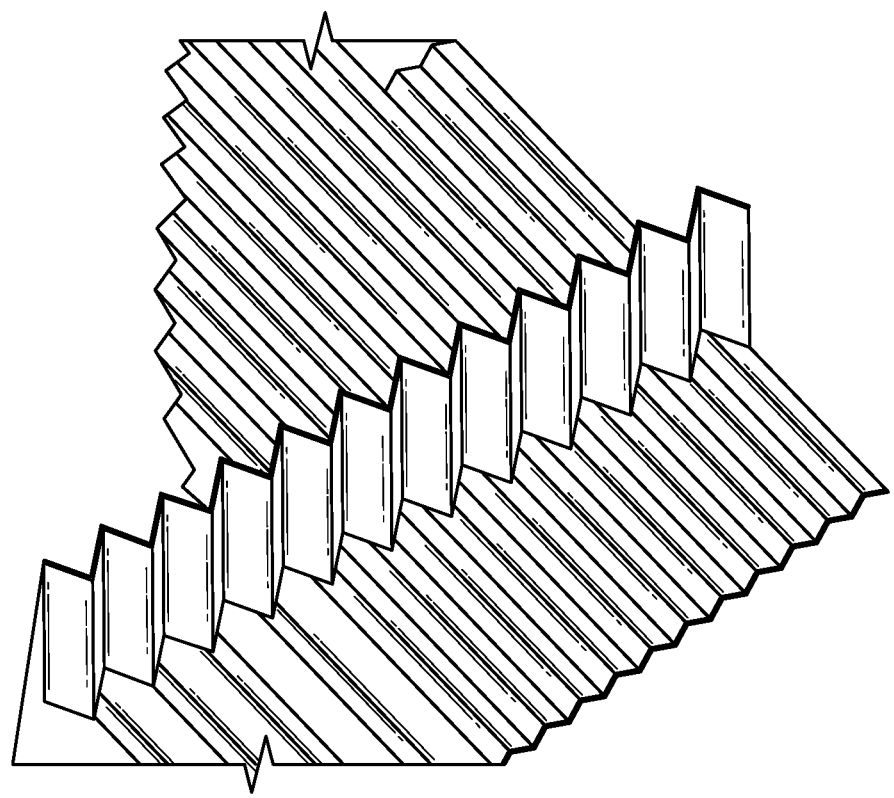
FIG. 7 illustrates a corrugated, non-planar surface, according to an aspect of the present disclosure.
Figure 8:
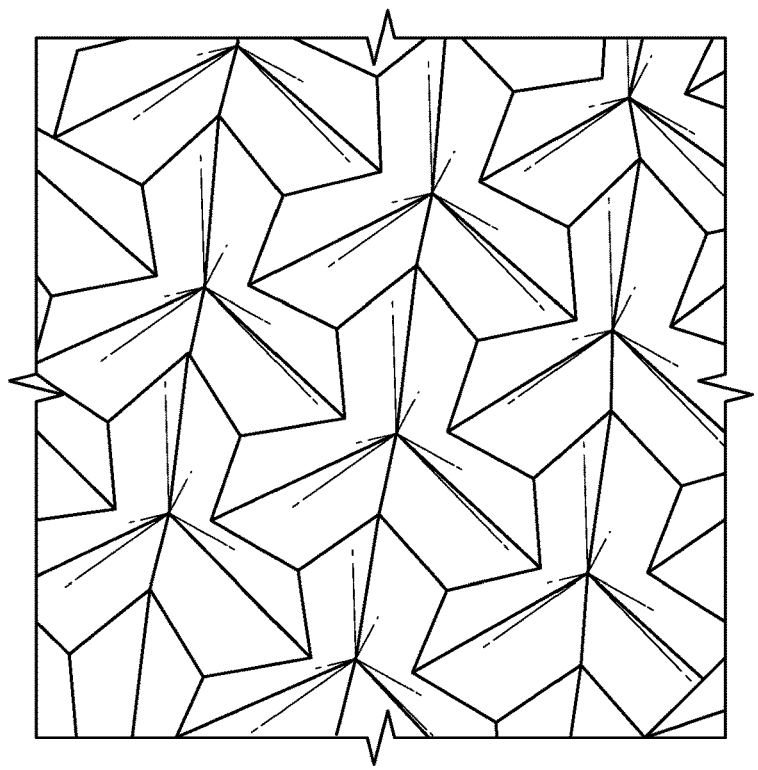
FIG. 8 illustrates a sharp, non-planar surface, according to an aspect of the present disclosure.
Figure 9:
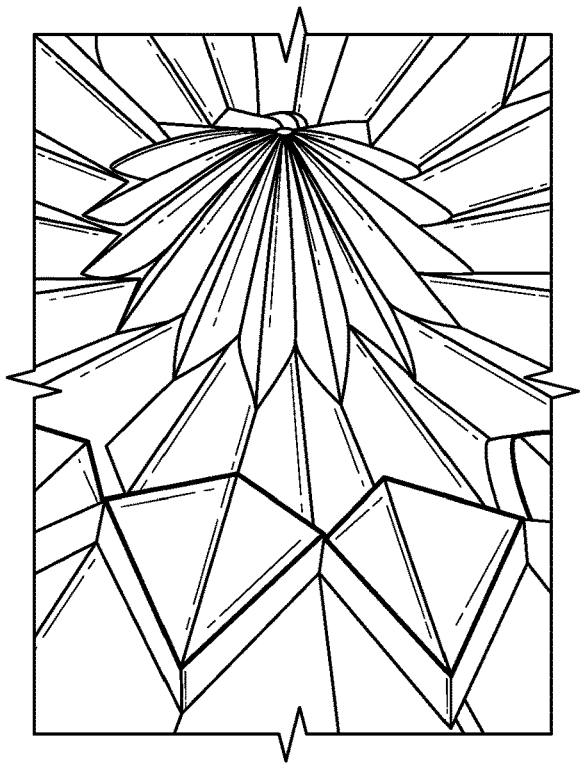
FIG. 9 illustrates a sharp, non-planar surface, according to an aspect of the present disclosure.
Figure 10:
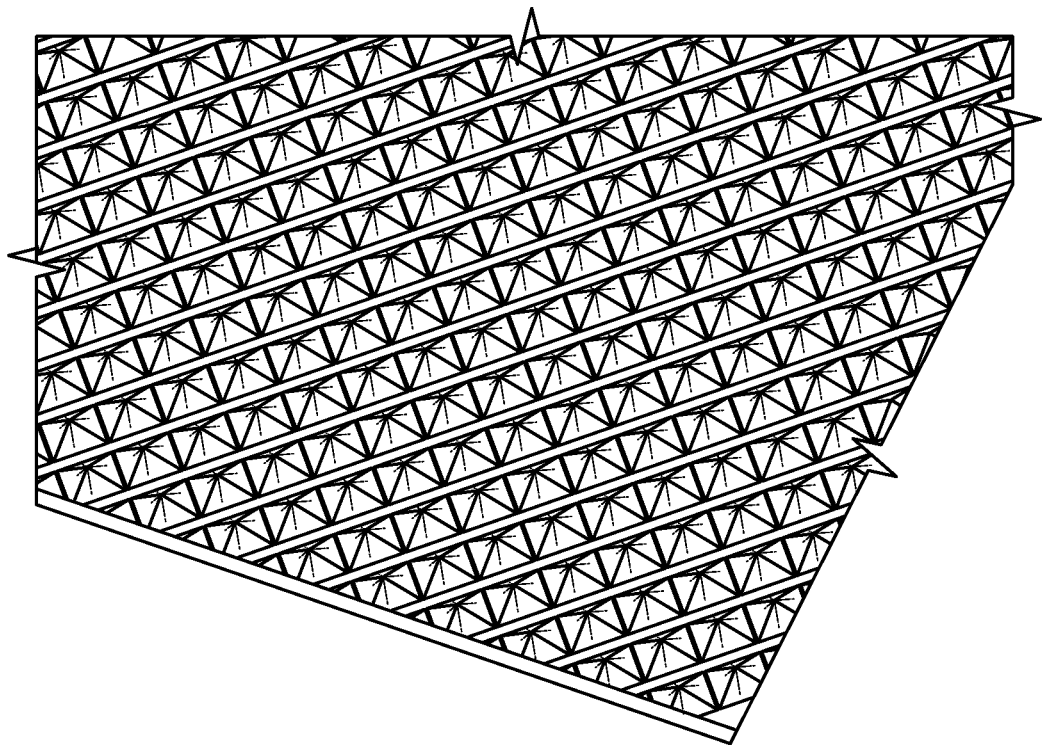
FIG. 10 illustrates a sharp, non-planar surface, according to an aspect of the present disclosure.
Figure 11:
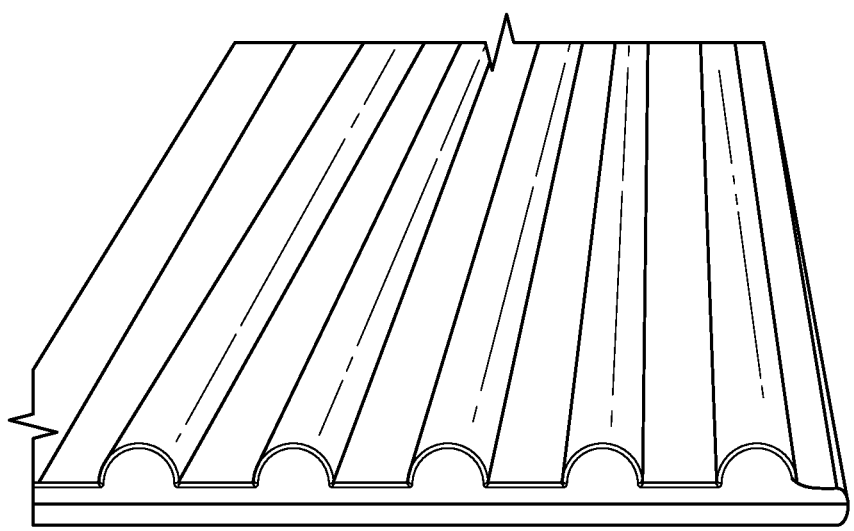
FIG. 11 illustrates a rutted, non-planar surface, according to an aspect of the present disclosure.

The methods of the present disclosure are not limited to fabricating acoustic panels, but can be employed for manufacturing any type of laminate panel or other structure that could benefit from application of adhesive segments 106 to a non-planar surface. For example, similar laminate panels as those described above, which may or may not have perforations 130, can be made by the methods of the present disclosure for use as floorboards of aircraft or other applications. Other examples may include application of segmented film adhesive to corrugated materials for making cardboard used in containers (e.g., cardboard boxes) and other products. Examples of suitable corrugated materials are shown in FIGS. 6 and 7. Still other types of non-planar materials that can be used with the segmented film adhesives of the present disclosure, including, for example, materials with sharp surfaces or other asperities, such as the surface asperities shown in FIGS. 8 to 11. For example, the segmented adhesives of the present disclosure can be applied to the raised asperities shown in any of FIGS. 6 to 11, which can then be adhered to a panel or other structure to form a laminate. Any other suitable non-planar surfaces from which laminates may be formed could also be employed.

Referring again to FIG. 1, the present disclosure is also directed to a method of making a segmented film adhesive 100. The method comprises providing a liner 102. A segmented adhesive layer 104 is formed on the liner. Any suitable method can be employed for forming the adhesive layer 104 on the liner. For example, one such method comprises depositing an adhesive material in a continuous layer using any suitable method, such as spraying, casting or dipping. The continuous layer can then be separated into discrete, contiguous segments 106, such as by cutting, chemical etching, laser etching, mechanical etching, segmented/on-off spraying, lift-off type patterning, or any other suitable technique. The segments are sufficiently disconnected from contiguous segments to allow independent release of each of the segments from the removable liner while allowing the other segments to remain on the liner. As another example, the method can comprise selectively depositing a segmented adhesive material comprising segments 106 onto the liner. Any suitable selective deposition process can be employed, which may include patterning the liner and then spraying the adhesive onto the patterned liner to form segments, silk screening or other techniques. Examples of such selective deposition techniques are generally well known in the art.

EXAMPLES

Example 1

A razor blade was rubbed with silicone and then used to score the adhesive surface of scotch tape. A suitable amount of pressure was applied so that the razor blade scored the adhesive, without completely severing the tape. The scored tape was pressed adhesive side down onto a surface of a desk and then the tape was lifted off the desk. It was found that scored sections of the adhesive remained on the desk surface after the scored tape was removed. In this example, it was found that smaller segments of adhesive were more likely to remain on the desk than very large segments. This example shows that segmented adhesive can be independently released from a film adhesive (in this example, the tape). Further, in some instances the size of the adhesive segments may be a factor in how easily the segments are released from the tape onto a surface of an adherend.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of applying a segmented film adhesive to a non-planar surface of a first adherend, the method comprising:
   providing the segmented film adhesive, the segmented film adhesive comprising: (i) a liner; and (ii) an adhesive layer on the liner, the adhesive layer comprising a plurality of contiguous, discrete adhesive segments;
   positioning the segmented film adhesive on the non-planar surface of the first adherend so that a first portion of the discrete adhesive segments are in contact with the non-planar surface and a second portion of the discrete adhesive segments are not in contact with the non-planar surface;
   removing the liner from the non-planar surface, wherein only the first portion of the discrete adhesive segments remain on the non-planar surface of the first adherend; and
   heating the discrete adhesive segments remaining on the non-planar surface of the first adherend to a sufficient temperature to melt or cure the adhesive.

2. The method of claim 1, wherein after removing the liner from the non-planar surface, the second portion of the discrete adhesive segments remain on the liner.

3. The method of claim 1, further comprising positioning a second adherend in contact with the discrete adhesive segments remaining on the non-planar surface of the first adherend, thereby adhering the first adherend to the second adherend.

4. The method of claim 3, wherein the first adherend and second adherend together form an acoustic panel configured for use in an aircraft.

5. The method of claim 4, wherein the first adherend comprises a honeycomb cell structure.

6. The method of claim 5, wherein the first adherend comprises paper.

7. The method of claim 6, wherein the paper is impregnated and/or coated with a resin.

8. The method of claim 6, wherein the paper is impregnated and/or coated with a phenolic resin.

9. The method of claim 5, wherein the first adherend comprises aluminum.

10. The method of claim 5, wherein the second adherend is a panel.

11. The method of claim 10, wherein the second adherend comprises perforations.

12. The method of claim 3, further comprising adhering a third adherend to a second non-planar surface of the first adherend using additional discrete adhesive segments, the second non-planar surface being opposite the non-planar surface of the first adherend.

13. The method of claim 3, wherein the first adherend and second adherend together form a laminate panel.

14. The method of claim 13, wherein the laminate panel is a floorboard of an aircraft.

15. The method of claim 3, wherein the first adherend and second adherend together form cardboard.

16. The method of claim 1, wherein the plurality of contiguous, discrete adhesive segments comprise a first adhesive segment and a plurality of second adhesive segments that are contiguous to the first adhesive segment.

17. The method of claim 1, wherein each of the adhesive segments have a first major surface contacting the liner and a second major surface opposite the first major surface, the second major surface of the adhesive segments being in a shape of a polygon.

18. The method of claim 1, wherein the liner comprises a material chosen from polyethylene, polyurethane, polyvinylidene difluoride [PVDF], polytetrafluoroethylene [PTFE], polyoxymethylene, silicone coated paper and silicone coated polymers.

19. The method of claim 1, wherein the adhesive segments comprise a pressure sensitive adhesive.

20. The method of claim 1, wherein the adhesive segments comprise a material chosen from polyurethane, epoxy, isocyanate, polyester and mixtures thereof.

* * * * *